(12) United States Patent
Furchtbar et al.

(10) Patent No.: US 8,029,750 B2
(45) Date of Patent: Oct. 4, 2011

(54) PROCESS AND DEVICE FOR REMOVAL OF EXHAUST GASES

(75) Inventors: Konstanze Furchtbar, Munich (DE); Roland Thalhammer, Munich (DE); Klemens Wawrzinek, Munich (DE)

(73) Assignee: Linde AG, Munich (DE)

( * ) Notice: Subject to any disclaimer, the term of this patent is extended or adjusted under 35 U.S.C. 154(b) by 0 days.

(21) Appl. No.: 12/332,700

(22) Filed: Dec. 11, 2008

(65) Prior Publication Data

US 2009/0152501 A1    Jun. 18, 2009

(30) Foreign Application Priority Data

Dec. 11, 2007 (DE) .......................... 10 2007 059 542

(51) Int. Cl.
*C22B 3/00* (2006.01)
*B01D 53/56* (2006.01)
(52) U.S. Cl. .......................................... 423/1; 423/235
(58) Field of Classification Search .......................... None
See application file for complete search history.

(56) References Cited

U.S. PATENT DOCUMENTS

| | | | | |
|---|---|---|---|---|
| 3,970,739 | A | * | 7/1976 | Shiraishi et al. .............. 423/235 |
| 5,403,366 | A | * | 4/1995 | Leininger et al. ........... 48/197 R |
| 5,929,126 | A | * | 7/1999 | Koveal et al. ................. 518/709 |
| 7,188,470 | B2 | * | 3/2007 | Bosteels ......................... 60/299 |
| 7,240,484 | B2 | * | 7/2007 | Li et al. .......................... 60/286 |
| 2005/0207961 | A1 | * | 9/2005 | Brooks et al. ................. 423/358 |
| 2007/0004809 | A1 | * | 1/2007 | Lattner et al. ................. 518/700 |
| 2008/0149010 | A1 | * | 6/2008 | Goff et al. ..................... 110/235 |
| 2008/0153042 | A1 | * | 6/2008 | Laux et al. ........................ 431/8 |

* cited by examiner

*Primary Examiner* — Melvin C Mayes
*Assistant Examiner* — Sheng H Davis
(74) *Attorney, Agent, or Firm* — Millen, White, Zelano & Branigan, P.C.

(57) ABSTRACT

The invention relates to a process as well as a device for removal of exhaust gas (7) that contains oxidizable pollutants. The exhaust gas (7) that contains oxidizable pollutants is introduced at a suitable location (a) into a flue gas system (K) that corresponds to a process oven (D) and is mixed with hot, oxygen-containing flue gas that flows through the flue gas system, whereby the exhaust gas (7) that contains oxidizable pollutants is heated to a temperature of at least 600° C.

2 Claims, 1 Drawing Sheet

PROCESS AND DEVICE FOR REMOVAL OF EXHAUST GASES

Figure 1:
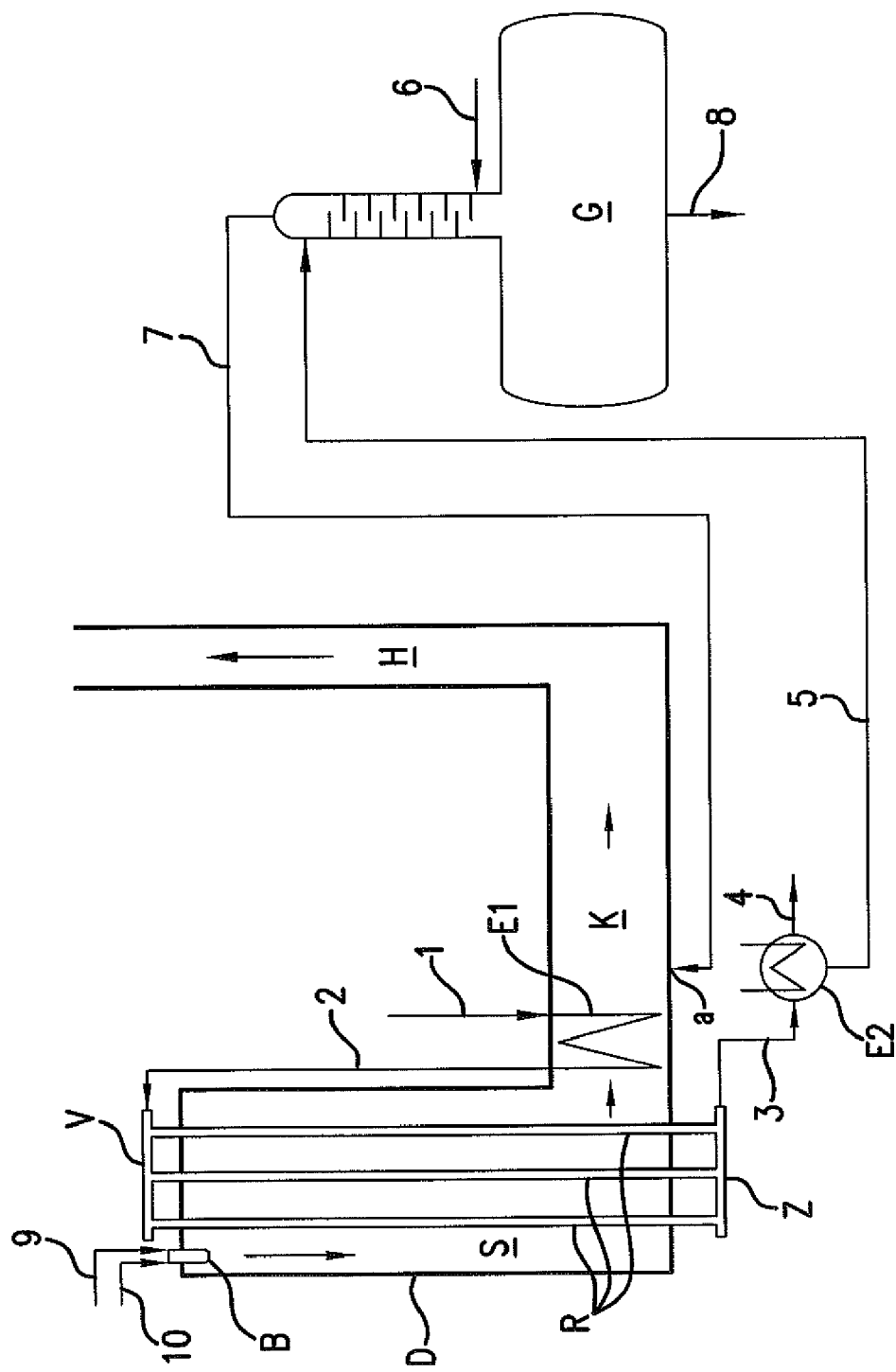

The invention relates to a process for removal of exhaust gas that contains oxidizable pollutants (exhaust gas) as well as a device for implementing the process.

In steam-reforming processes, feedstocks that contain hydrocarbons, such as natural gas, light gasoline, or naphtha, are mixed with water vapor and reacted in steam reformers to form synthesis gas—a gas mixture that contains carbon monoxide (CO) and hydrogen ($H_2$). In further process steps, substances such as CO, $H_2$, or oxo gas (a defined mixture that consists of $H_2$ and CO) are obtained from the synthesis gas by purification and separation and released as products. To react the hydrocarbons that are used with a high degree of conversion, the steam reforming is usually performed with excess water vapor. To remove excess water, the synthesis gas that is produced in this way is cooled until it is below the water vapor dew point, by which the water vapor condenses out and forms a so-called process condensate, which predominantly consists of water and in general is contaminated by pollutants such as hydrogen, carbon monoxide, methane, methanol, formic acid and acetic acid. If the feed stock contains nitrogen, as is the case in particular in natural gas, which can consist of up to 20% by volume of nitrogen depending on the origin, ammonia also goes into the process condensate in considerable quantities.

According to the prior art, the process condensate is introduced into a degassing device (degasser), pollutants are removed from it there, and then it is evaporated from substance flows that are to be cooled or can be cooled in the steam-reforming process. After the steam from exhaust gases that can be cooled is superheated, at least a portion of the steam (process steam) is used in-process.

To purify the process condensate, processes are known in which the pollutants are separated by stripping in stripping columns. In this connection, substance flows (e.g., natural gas) that contain low-pressure water vapor, air, nitrogen or hydrocarbons are used as stripping gases. In this case, the pollutants are drawn off as exhaust gas together with the stripping gas. If the concentrations of the pollutants in the exhaust gas lie below the legal boundary values, the exhaust gas can be released into the atmosphere without further treatment. If the concentration of even only one pollutant exceeds the legal boundary value, however, the exhaust gas has to be treated in a suitable way before the release into the atmosphere to meet the requirements involving emissions.

According to the prior art, the exhaust gases are burned in, for example, an excess gas burner or they are completely condensed and then fed to a process for removal. All of these methods are expensive and cost-intensive.

The object of the invention is therefore to indicate a process of the above-mentioned type as well as a device for implementing the process, by which the drawbacks of the prior art are overcome.

This object is achieved on the part of the process according to the invention in that the exhaust gas is introduced at a suitable location into a flue gas system that corresponds to a process oven and is mixed with hot, oxygen-containing flue gas that flows through the flue gas system, whereby the exhaust gas is heated to a temperature of at least 600° C.

The invention is based on the knowledge that—assuming the existence of sufficiently long dwell times and an adequately high oxygen concentration—the oxidizable pollutants can be converted into harmless substances, such as water and carbon dioxide, and released into the atmosphere together with the flue gas from the process oven. The pollutants can also then be oxidized at the required temperatures if they are present in low concentrations in the flue gas.

The process according to the invention is in particular suitable for removing exhaust gases in which pollutants such as hydrogen and/or carbon monoxide and/or methane and/or methanol and/or organic acids and/or ammonia are contained. With the exception of ammonia, these pollutants are oxidized in the hot flue gas stream with the oxygen that is present in the flue gas corresponding to the following equation:

$$C_xH_yO_z + (x+0.25y-0.5z)O_2 \leftrightarrow xCO_2 + 0.5yH_2O$$

Ammonia that is contained in the exhaust gas reacts as follows with the oxygen that is contained in the flue gas to form uncritical nitrogen and water:

$$2NH_3 + 1.5O_2 \leftrightarrow N_2 + 3H_2O$$

If the hot flue gas also contains nitric oxides, ammonia can be degraded via another reaction. This reaction is known as a selective, non-catalytic reduction (abbreviated SNCR, for Selective Non Catalytic Reduction) and forms the basis for the industrial removal of nitrogen from flue gases. It proceeds according to the following reaction equation:

$$2NO + 2NH_3 + 0.5O_2 \leftrightarrow 2N_2 + 3H_2O$$

The process according to the invention makes it possible to remove or at least to reduce the pollutants that are contained in the exhaust gas. If ammonia is also contained in the exhaust gas, moreover, nitric oxides that are also present in the flue gas are at least reduced. The goal of the process is to completely degrade the pollutants, but at least to reduce them to the point where the pollutant concentrations in the flue gas or in the mixture of substances that is formed from the flue gas and exhaust gas do not exceed the legal boundary values.

The ammonia degradation according to the above-indicated reaction equations is superimposed by an ammonia oxidation, in which nitrogen monoxide is formed. Since this process dominates above about 1050° C., this temperature range is to be avoided in the removal of exhaust gas that contains ammonia according to the invention, since here specifically ammonia is degraded; the quantity of the nitric oxides emitted with the flue gas, however, is increased.

When the temperature drops, the reaction speed of the above-indicated degradation reactions decreases. This has the result that below 600° C., the ammonia that is contained in the exhaust gas is no longer degraded to an adequate extent.

A preferred configuration of the process according to the invention therefore calls for the exhaust gas that contains ammonia to be introduced into the oxygen-containing flue gas so that the ammonia that is introduced with the exhaust gas is heated to a temperature of between 600 and 1050° C.

Last but not least, ammonia-containing exhaust gas accumulates in the degassing of process condensate in synthesis gas units, in which a nitrogen-containing feedstock is reacted by steam reforming in a steam reformer that is heated from the outside (process oven). In this connection, the steam reformer is connected to a flue gas system, via which oxygen-containing flue gas that accumulates in the heating of the steam reformer is discharged into the atmosphere. The flue gas enters into the flue gas system at high temperatures, which in general are far above 1000° C. An especially preferred variant of the process according to the invention therefore calls for exhaust gas that contains ammonia and that accumulates in such synthesis gas units being introduced into the flue gas system of the steam reformer, whereby the ammonia that is introduced with the exhaust gas is heated to a temperature of between 600 and 1050° C.

To use the heat that is contained in the flue gases, the flue gas systems of the steam reformers are provided in general with heat exchangers, through which, for example, feedstocks are run for the steam reforming and in this case are preheated. In this connection, the flue gases are relatively quickly cooled, and quickly pass through the temperature range of between 1050 and 600° C. that is optimum for the ammonia degradation. To ensure that a sufficiently large portion of the ammonia molecules comes into contact with the necessary reactants under these conditions, the ammonia-laden exhaust gas is intensively and quickly mixed with the flue gas according to the invention. For this purpose, the exhaust gas that is to be removed should be directed into the hot flue gas at a sufficiently high speed for a good mixing. In addition, contact of the exhaust gas that contains ammonia with locations that are hotter than 1050° C., e.g., the oven wall, has to be avoided to prevent conversion of ammonia into nitric oxide.

In addition, the invention relates to a device for removing exhaust gas that contains oxidizable pollutants (exhaust gas).

This object is achieved on the part of the device according to the invention in that the exhaust gas is introduced at a suitable location into a flue gas system that corresponds to a process oven and is mixed with a hot, oxygen-containing flue gas that flows through the flue gas system, whereby the exhaust gas that contains oxidizable pollutants can be heated to a temperature of at least 600° C.

The device according to the invention is in particular suitable for removing exhaust gases in which pollutants such as hydrogen and/or carbon monoxide and/or methane and/or methanol and/or organic acids and/or ammonia are contained.

In a suitable configuration, the device according to the invention comprises a mixing device, by which the exhaust gas that contains pollutants can be mixed quickly and intensively with the flue gas. By the intensive and quick mixing, it is achieved that a sufficiently large portion of the pollutant molecules comes into contact with the reactants that are necessary for the degradation reaction and are degraded.

Last but not least, ammonia-containing exhaust gas accumulates in synthesis gas units in which a nitrogen-containing feedstock can be reacted by steam reforming in a steam reformer that is heated from the outside (process oven). According to the prior art, such synthesis gas units comprise a device (degasser) for degassing process condensate, in which the ammonia-containing exhaust gas can be produced as well as a flue gas system for discharging the hot, oxygen-containing flue gas that accumulates in the heating of the steam reformer into the atmosphere. An especially preferred variant of the device according to the invention therefore calls for the degasser being connected to the flue gas system via a line system in such synthesis gas units, via which line system the ammonia-containing exhaust gas from the degasser can be introduced into the flue gas system at a suitable location, whereby the ammonia that is fed with the exhaust gas can be heated to a temperature of between 600 and 1050° C.

Below, the invention is to be explained in more detail based on an embodiment that is depicted diagrammatically in the figure.

FIG. 1 is an embodiment of the device for removing exhaust gases.

The embodiment shows a cutaway from a synthesis gas unit, in which a synthesis gas that contains hydrogen, carbon monoxide and water vapor is produced from nitrogen-containing natural gas and water vapor in a steam reformer that is heated from the outside with burners. Process condensate that accumulates when the synthesis gas is cooled is prepared in a degasser and recycled into the process.

Via line 1, a mixture that consists of natural gas and water vapor is introduced into the heat exchanger E1 that is arranged in the convection zone K, which is part of the flue gas system of the unit, and it is preheated by hot flue gas. The preheated natural gas/water vapor mixture is conveyed via line 2 to the distributor V and distributed in the reactor pipes R that are filled with a suitable catalyst material, in which it is reacted in an endothermic reaction in a synthesis gas that contains hydrogen and carbon monoxide. The synthesis gas is collected in the collector Z and sent via line 3 to the cooler E2. In the cooler E2, the synthesis gas is cooled to below the water dew point, whereby a gas fraction 4 that contains carbon monoxide and hydrogen and process condensate 5 are produced. Then, in additional process steps, not shown, gas products are produced from the gas fraction 4, while the process condensate 5, which consists mainly of water, and in addition also contains dissolved gases such as carbon monoxide, but primarily ammonia, is fed for working-up to the degasser G that is designed as a stripping column and is released at its top. As stripping gas, low-pressure water vapor is used, which is introduced via line 6 into the degasser G. An exhaust gas, which consists of the gas components and water vapor stripped from the process condensate 5, is drawn off from the degasser G via line 7. In the bottom of the degasser G, degassed water, which is recycled as process water via line 8 again into the process, is collected.

The energy that is required for the endothermic steam-reforming reaction is produced via burner B, in which fuel 9 is burned with air 10 with excess oxygen. The hot flue gas that is produced in this case (direction of flow indicated by arrows), which in addition to oxygen also contains nitric oxides, in particular nitrogen monoxide (NO), releases a large part of its tangible warmth, primarily by radiation, into the radiation zone S, whereby the reactants flow through the reactor pipes R. At a temperature that is always considerably above 1000° C., the cooled flue gas is drawn off from the radiation zone S and introduced into the convection zone K, in which it is cooled by process streams that are to be heated before it goes into the atmosphere via the chimney H.

The ammonia-containing exhaust gas 7, whose ammonia content exceeds the legal boundary value, cannot be released into the atmosphere without a treatment. It is therefore introduced into the convection zone K and intensively mixed with the hot flue gas that flows therein. The discharge point a for the exhaust gas 7 is selected so that the exhaust gas is heated by the flue gas up to a temperature of more than 600° C., but heating to more than 1050° C. is definitely avoided. In this temperature range, the ammonia that is introduced with the exhaust gas 7 reacts with the nitrogen monoxide, contained in the flue gas, and oxygen to form water and nitrogen that are quite safe with respect to emissions.

The invention claimed is:

1. A process for removal of exhaust gas (7) which accumulates in the degassing of process condensate in a synthesis gas unit,
    said synthesis gas unit comprising a steam reformer (D) that is heated from the outside, a flue gas system (K, H) that discharges into the atmosphere oxygen-containing flue gas that accumulates during the heating of the steam reformer (D), and a degasser unit (G) which degasses process condensate and produces the exhaust gas (7),
    wherein exhaust gas (7) contains oxidizable pollutants comprising ammonia and hydrogen and/or carbon monoxide and/or methane and/or methanol and/or organic acids, said process comprising:
    introducing the exhaust gas (7) into the flue gas system and mixing, in a reaction zone consisting of gaseous substances, with hot, oxygen-containing flue gas that flows through said flue gas system, wherein the ammonia that is introduced with the exhaust gas (7) is heated to a temperature of between 600 and 1050° C.

2. A process according to claim 1, wherein said flue gas enters into said flue gas system at a temperature above 1000° C.

* * * * *